United States Patent [19]
Prince

[11] Patent Number: 5,309,666
[45] Date of Patent: May 10, 1994

[54] SWIMMING FISHING WEIGHT

[76] Inventor: Larry W. Prince, 4944 Via Ventura St., #5, Mesquite, Tex. 75150

[21] Appl. No.: 931,819

[22] Filed: Oct. 16, 1992

[51] Int. Cl.⁵ .............................................. A01K 95/00
[52] U.S. Cl. ................................................... 43/43.13
[58] Field of Search .................. 43/43.13, 44.9, 44.95, 43/44.96, 44.97, 44.81; D22/145

[56] References Cited

U.S. PATENT DOCUMENTS

| | | | |
|---|---|---|---|
| 781,385 | 1/1905 | Williams | 493/154 |
| 1,257,949 | 2/1918 | Adelson | 493/468 |
| 1,814,546 | 7/1931 | Carson | 493/154 |
| 1,993,114 | 3/1935 | Rasmussen | 43/43.13 |
| 2,481,707 | 9/1949 | Young | 43/43.13 |
| 2,749,651 | 6/1956 | Snider | 43/43.13 |
| 3,248,820 | 5/1966 | Lamar | 43/44.81 |
| 3,925,921 | 12/1975 | Tucker et al. | 43/44.97 |
| 3,940,871 | 3/1976 | Evans | 43/43.13 |
| 4,026,061 | 5/1977 | Schuman | 43/43.13 |
| 4,212,232 | 7/1980 | Lee | 493/152 |
| 4,235,160 | 11/1980 | Olney | 493/63 |
| 4,683,598 | 8/1987 | Jones | 4/301 |
| 4,771,484 | 9/1988 | Mozell | 4/144.4 |
| 4,858,370 | 8/1989 | Ryder | 43/43.13 |

*Primary Examiner*—P. Austin Bradley
*Assistant Examiner*—Jeanne M. Elpel
*Attorney, Agent, or Firm*—John F. Bryan, Jr.

[57] ABSTRACT

A bottom fishing weight is provided with an attaching eye for a fishing line at the leading end. The leading portion of the lower surface of the weight is upwardly inclined so as to create a lifting force when reeled in and the trailing portion of the lower surface is concavely cupped to also create a downward force which stabilizes the attitude of the weight. A vertical fin on the upper surface of the weight is included to improve directional stability.

2 Claims, 1 Drawing Sheet

SWIMMING FISHING WEIGHT

FIELD OF THE INVENTION

The present invention relates to the field of fishing weights, and more particularly, weights placed at the end of a baited fishing line for bottom fishing which are made to rise directly to the surface of the water when reeled in and thus, to avoid snagging on growth or bottom debris.

BACKGROUND AND SUMMARY OF THE INVENTION

Lake or river bottom fishing is a specialized variation of the sport wherein a weight is placed at the end of the line, below one or more baited hooks, so as to carry the line out and to the bottom when cast. Lake bottoms, in particular, are commonly cluttered by debris and growth which may snag the line upon retrieval and the further the line is cast, the more likely this will happen.

The object of the present invention therefore, is to provide a fishing weight which swims to the surface upon retrieval and thereby lifts the line and hook rapidly from the bottom so as to minimize the potential of snagging debris by the hook or the weight itself.

DESCRIPTION OF THE DRAWINGS

The aforementioned and other objects and features of the invention will be apparent from the following detailed description of an embodiment thereof, when read in conjunction with the drawings, in which.

DETAILED DESCRIPTION OF THE DRAWINGS

Figure 1:
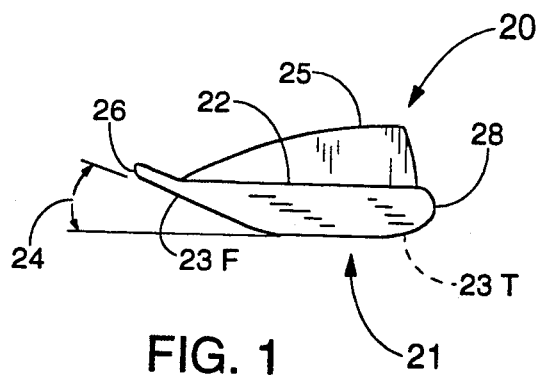
FIG. 1 shows a side view of the fishing weight of the present invention.
Figure 2:
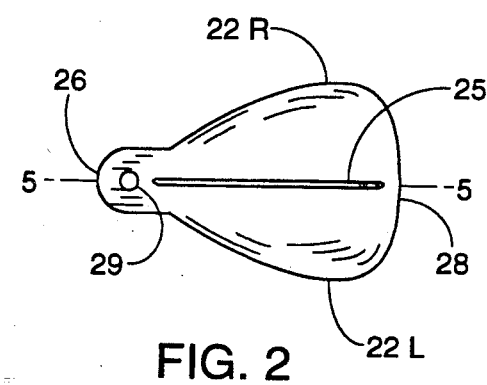
FIG. 2 shows a top view of the fishing weight of FIG. 1.

Turning now to FIG. 1, a preferred embodiment of weight 20 in accordance with the present invention, is seen to comprise a symmetrical flattened body 21 having an upper surface 22 and a lower surface 23. Leading portion 23F of lower surface 23 is angled upwardly at ramp angle 24, to leading end 26 so as to provide lift when body 21 is pulled through the water during retrieval of a cast. Ramp angle 24 is 20 degrees in this preferred embodiment of weight 20. Concavely cupped, or spoon-shaped trailing portion 23T of lower surface 23, which extends from leading portion 23F to trailing end 28, is obscured in this view by the lateral extension 22L of upper surface 22. Vertical fin 25 is positioned on upper surface 22, along the axis of symmetry, as is shown in the top view of FIG. 2 and serves to maintain direction stability as weight 20 is reeled in through the water. The symmetry of body 21 and of the extended upper surfaces 22L and 22R is also apparent. Attachment eye 29 is located at the leading end 26 and provides for a connection to the fishing line.

Figure 3:
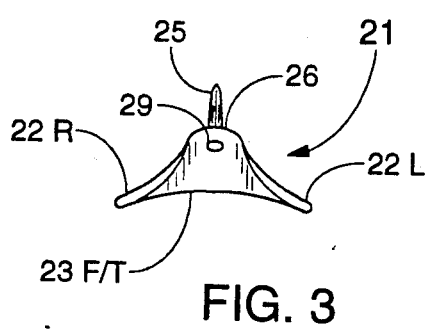
FIG. 3 shows a front end view of the fishing weight of FIG. 1.

FIG. 3, a view from the leading end 26, shows how the upper surface 22 curves downwardly to form lateral extensions 22L and 22R. The location of attachment eye 29 is noted to be well above body 21. Here is shown the curved contour 23F/T of the intersection of lower surface leading portion 23F and lower surface trailing portion 23T.

Figure 4:
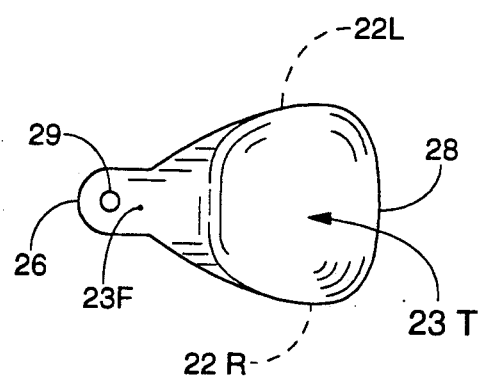
FIG. 4 shows a bottom view of the fishing weight of FIG. 1.
Figure 5:
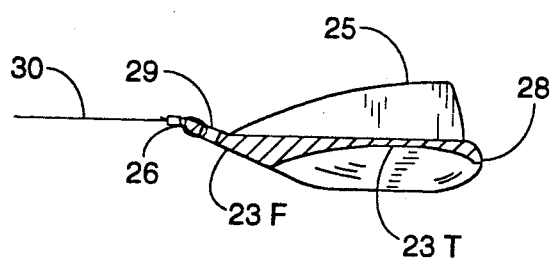
FIG. 5 shows the section view indicated by line 5—5 of FIG. 2.

The concavely cupped surface of trailing portion 23T is seen in FIG. 4 and in the section view of FIG. 5. Here, it is also apparent that an upward lifting force will be exerted upon lower surface leading portion 23F when weight 20 is pulled through the water by line 30 at attachment eye 29. Concavely cupped trailing portion 23T will generate a smaller stabilizing downward Bernoulli force on body 21 under these conditions, so that clockwise and counterclockwise force moments about attaching eye 29 are equal. Should trailing end 28 rotate upwardly, reducing the angle of leading portion 23F relative to the direction of retrieval, the Bernoulli force, or incipient cavitation, at concavely cupped trailing portion 23T is increased. This acts to restore the attitude of body 21 and maintain its lifting force as the line is reeled in.

It is to be understood that the present invention is not limited to the disclosed embodiment and may also be expressed by modification or substitution of parts within the same spirit.

I claim:

1. A fishing line weight which rises to the surface of the water upon retrieval comprising:
    a flattened body with a leading and a trailing end and a longitudinal axis of symmetry and having upper and lower surfaces which have leading end portions and trailing end portions wherein the leading end portion of said lower surface is upwardly inclined and the trailing end portion of said lower surface is concavely cupped;
    a vertical fin attached to said upper surface in alignment with said axis of symetry; and
    attachment means for connecting a fishing line at said leading end and for pulling said body through the water.

2. A method for causing a fishing weight to rise to the surface of the water upon retrieval comprising the steps of:
    providing a weight of a flattened shape with leading and trailing ends and having upper and lower surfaces which have leading and trailing end portions;
    providing the lower surface of the weight with an upwardly inclined leading end portion and a concavely cupped trailing end portion;
    attaching a line to the leading end of the weight;
    pulling the weight through the water by the line to create an upward force on the leading end portion while also creating a downward force on the concavely cupped trailing end portion so as to stabilize the attitude of the weight and maintain the upward force;
    providing a vertical fin; and
    maintaining directional stability with the vertical fin while pulling the weight through the water.

* * * * *